(12) United States Patent
Litvin et al.

(10) Patent No.: US 7,992,310 B2
(45) Date of Patent: Aug. 9, 2011

(54) REFERENCE BEAM GENERATOR AND METHOD

(75) Inventors: Timothy J. Litvin, Santa Cruz, CA (US); Kevin Marc Morrissey, Xenia, OH (US); Steve Curtiss, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 142 days.

(21) Appl. No.: 12/190,801

(22) Filed: Aug. 13, 2008

(65) Prior Publication Data

US 2010/0039712 A1 Feb. 18, 2010

(51) Int. Cl.
*G01C 15/00* (2006.01)
*G01B 11/26* (2006.01)

(52) U.S. Cl. .................... 33/286; 33/281; 33/DIG. 21

(58) Field of Classification Search .............. 33/276, 33/278, 279, 280, 281, 284, 285, 286, DIG. 21
See application file for complete search history.

(56) References Cited

U.S. PATENT DOCUMENTS

| | | | |
|---|---|---|---|
| 5,218,770 A | 6/1993 | Toga | |
| 5,307,368 A * | 4/1994 | Hamar | 372/107 |
| 5,539,990 A | 7/1996 | Le | |
| 5,864,956 A * | 2/1999 | Dong | 33/227 |
| 5,872,657 A | 2/1999 | Rando | |
| 6,065,217 A * | 5/2000 | Dong | 33/290 |
| 6,292,303 B1 * | 9/2001 | Hamar | 359/641 |
| 6,430,823 B1 * | 8/2002 | Seki | 33/281 |
| 6,848,188 B2 | 2/2005 | Tacklind et al. | |
| 6,892,464 B2 * | 5/2005 | Ohtomo et al. | 33/290 |
| 6,931,739 B2 * | 8/2005 | Chang et al. | 33/286 |
| 7,116,697 B1 * | 10/2006 | Dong | 372/109 |
| 7,121,010 B2 * | 10/2006 | Marshall et al. | 33/286 |
| 7,124,513 B2 | 10/2006 | Chen et al. | |
| 7,127,821 B1 * | 10/2006 | Weisz et al. | 33/277 |
| 7,136,233 B2 | 11/2006 | Dang | |
| 7,178,250 B2 | 2/2007 | Nash et al. | |
| 7,181,853 B2 * | 2/2007 | Heger et al. | 33/286 |
| 7,464,478 B2 * | 12/2008 | Adrian | 33/286 |
| 2003/0009891 A1 * | 1/2003 | Ohtomo et al. | 33/286 |

FOREIGN PATENT DOCUMENTS

| | | | |
|---|---|---|---|
| JP | 11044535 A | * | 2/1999 |
| JP | 11063996 A | * | 3/1999 |
| JP | 2000230827 A | * | 8/2000 |
| JP | 2006184196 A | * | 7/2006 |
| TW | 382454 U | * | 2/2000 |

* cited by examiner

*Primary Examiner* — R. Alexander Smith
(74) *Attorney, Agent, or Firm* — Dinsmore & Shohl LLP

(57) ABSTRACT

A reference beam generator has first, second, and third projection turrets for projecting first, second, and third fan beams of laser light, respectively. The first, second, and third fan beams of laser light are oriented normal to each other. The turrets may be rotated such that each of said fan beams can each be rotated about an axis that is normal to the plane in which the fan beam is projected. The generator may be used to project a number of reference points and lines on multiple surfaces.

14 Claims, 22 Drawing Sheets

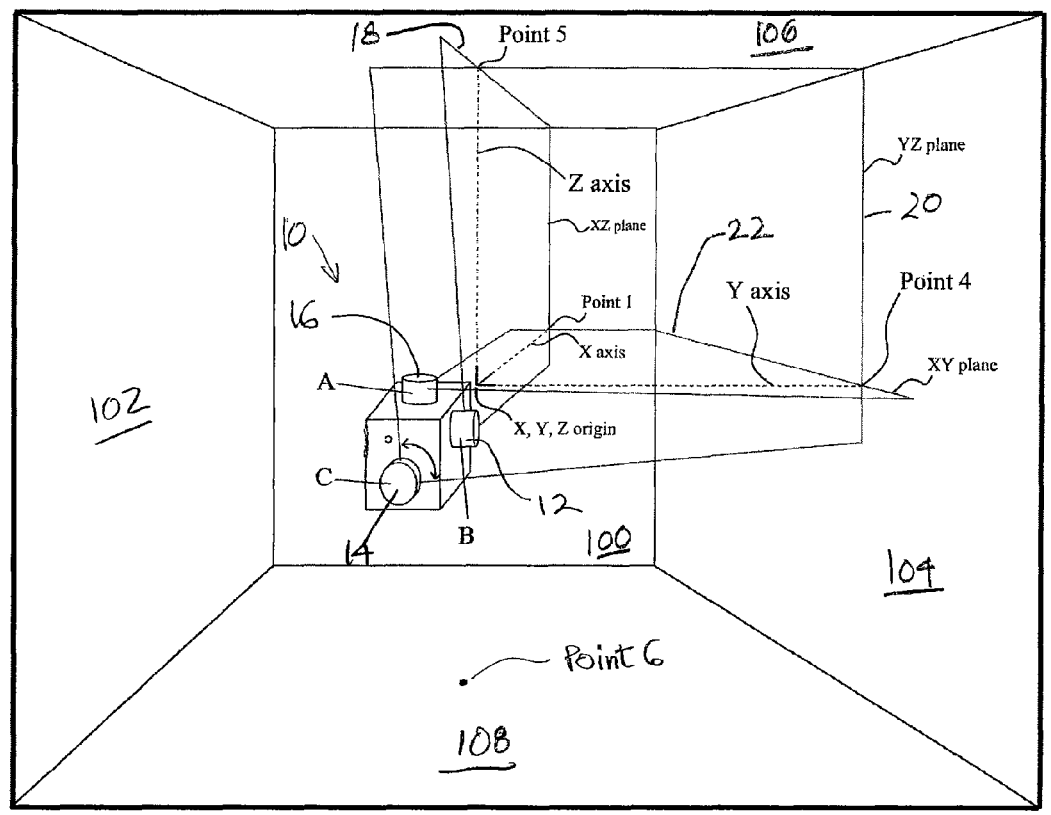

REFERENCE BEAM GENERATOR AND METHOD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

This relates to reference beam generators of the type used to project plumb, level, and square reference beams of visible light on walls, ceilings or floors to facilitate spatial positioning at a construction site or elsewhere. Such tools have been used to provide visible reference lines for construction layout of walls, beams, joists, ceilings, laying tiles, hanging shelves and cabinets, and for a many other similar activities.

Prior art reference beam generators have typically produced only one or two reference beams in specific geometric configurations. While useful, such devices have limited application. Additionally, commonly such devices provide stationary reference beams, or rotating beams. Stationary reference beams are of limited use. Devices which produce rotating reference beams, provide the ability to produce a line across a surface. However, in order for the line to be visible, a somewhat higher power light source, typically a laser, is required because the power of the rotating beam is spread over the entire 360 degree rotation of the beam. A relatively short length of the beam path across a wall or other surface might only receive one-tenth of the beam's power, for example, if it amounts to only one-tenth of a rotation of the beam. Therefore, a higher power laser light source must necessarily be included in the device. Not only does this reduce battery life, but it also raises safety concerns. Should the beam stop rotating, then the power of the beam directed at a stationary point must somehow be reduced, or the laser must be switched off immediately.

It is seen that there is a need for a reference beam generator which provides maximum flexibility in its use, provides multiple reference beams, and permits adequate operation with lower power consumption and lower beam power levels.

SUMMARY OF THE INVENTION

These needs are met by a reference beam generator that includes a first projection turret for projecting a first fan beam of laser light, a second projection turret for projecting a second fan beam of laser light, and a third projection turret for projecting a third fan beam of laser light. The first fan beam of laser light is projected in a first plane, the second fan beam of laser light is projected in a second plane normal to the first plane, and the third fan beam of laser light is projected in a third plane that is normal to both the first plane and the second plane. A turret support supports the first, second, and third projection turrets such that each turret may be pivoted through a complete revolution about an axis that is normal to the plane in which it projects a fan beam of laser light. The turret support includes a first pivot arrangement for supporting the first turret, a second pivot arrangement for supporting the second turret, and a third pivot arrangement for supporting the third turret. Each of the first, second and third pivot arrangements permits an operator to rotate the turret manually and provides sufficient friction that the turret remains in position after it is rotated.

Each of the first, second, and third projection turrets may comprise a laser diode providing a beam of laser light; a power source for providing power to the laser diode; and a lens for redirecting the beam into a fan shape. The power source in each of the turrets may comprise a battery. Each of the projection turrets may further comprise a turret body housing the laser diode, the power source, and the lens, with each of the projection turrets having a pivot arrangement connecting the turret body to the turret support. The pivot arrangement provides for pivotal movement of the turret about an axis substantially normal to the plane in which the fan beam of laser light is projected from the turret. Bubble vials may be provided on the turret support to facilitate leveling the turret support, so that the fan beams can be projected in vertical or horizontal planes.

The projection turret support may include a first pivot arrangement for supporting the first turret, the first pivot arrangement including a first pivot motor for rotating the first turret; a second pivot arrangement for supporting the second turret, the second pivot arrangement including a second pivot motor for rotating the second turret; and a third pivot arrangement for supporting the third turret, the third pivot arrangement including a third pivot motor for rotating the third turret. Each of the first, second and third pivot motors is responsive to a motor control circuit.

Each of the first, second, and third projection turrets may comprise a turret body; a laser diode and a cylinder lens in the turret body, the laser diode providing a beam of laser light, and the cylinder lens changing the beam into a fan shape; and a pivot arrangement connecting the turret body to the turret support. The laser diode may be powered by a battery in the turret support. The battery may be connected to the laser diode by means of sliding electrical contacts. Each laser diode provides a beam of laser light of sufficient diameter such that a part of the beam passes around the cylinder lens, thereby producing a spot in the center of a line of laser light projected from the turret.

The first, second and third fan beams of laser light may each be green in color. The first, second, and third projection turrets may have laser diodes that can be individually switched on. The generator may include a time of flight measurement arrangement for modulating at least one of the laser beams, detecting reflection of the modulated beam to the generator, and determining the distance from the generator of the surface from which the modulated beam was reflected.

A method of projecting reference points of light on multiple surfaces using a reference beam generator having first, second, and third projection turrets for projecting first, second, and third fan beams of laser light, respectively, the first, second, and third fan beams of laser light oriented to be normal to each other, and the turrets being rotatable such that each of the fan beams can each be rotated about an axis that is normal to the plane in which the fan beam is projected, may include the steps of: orienting the reference beam generator with respect to the multiple surfaces; projecting the first and second fan beams of laser light on a first surface such that a first reference point is defined on the first surface at the intersection of the two beams; rotating one of the first and second fan beams such that it strikes a second surface adjacent to the first surface; and projecting the third of the first, second, and third fan beams such that it strikes the second surface and intersects the one of the first and second fan beams that strikes the second surface, thereby defining a second reference point on the second surface. The step of orienting the reference beam generator with respect to the multiple surfaces may comprise the step of leveling the reference beam generator. The step of orienting the reference beam generator with respect to the multiple surfaces may comprise the step of positioning the generator with respect to the surfaces.

The method of projecting reference points of light on multiple surfaces may include the steps of orienting the reference beam generator with respect to the multiple surfaces; projecting the first and second fan beams of laser light on a first surface such that a first reference point is defined on the first surface at the intersection of the two beams; rotating both of the first and second fan beams such that they both strike a second surface opposite the first surface; and projecting the first and second fan beams such that they strike the second surface and intersect thereon, thereby defining a second reference point on the second surface. The step of orienting the reference beam generator with respect to the multiple surfaces may comprise the step of leveling the reference beam generator. The step of orienting the reference beam generator with respect to the multiple surfaces may comprise the step of positioning the generator with respect to the surfaces.

A method of projecting reference points of light on multiple surfaces using a reference beam generator having first, second, and third projection turrets for projecting first, second, and third fan beams of laser light, respectively, with the first, second, and third fan beams of laser light oriented to be normal to each other, and the turrets being rotatable such that each of said fan beams can each be rotated about an axis that is normal to the plane in which the fan beam is projected, includes the steps of orienting the reference beam generator with respect to the multiple surfaces; projecting the first and second fan beams of laser light on a first surface such that a first reference point is defined on the first surface at the intersection of the two beams; and projecting the third of the first, second, and third fan beams such that it strikes the second and third surfaces and intersects the first and second fan beams. By this arrangement, a second reference point is defined on the second surface with the intersection of the first and third fan beams and a third reference point is defined on the third surface with the intersection of the second and third fan beams. The method may include the step of leveling the reference beam generator. The step of orienting the reference beam generator with respect to multiple surfaces may comprise the step of positioning the generator with respect to the surfaces.

Accordingly, it is an object to provide a reference beam generator in which the construction and operation of the generator are improved.

BRIEF DESCRIPTION OF THE DRAWINGS

FIGS. 6 through 22 illustrate methods of use of the reference beam generator.

DETAILED DESCRIPTION OF THE PREFERRED EMBODIMENTS

Figure 1:
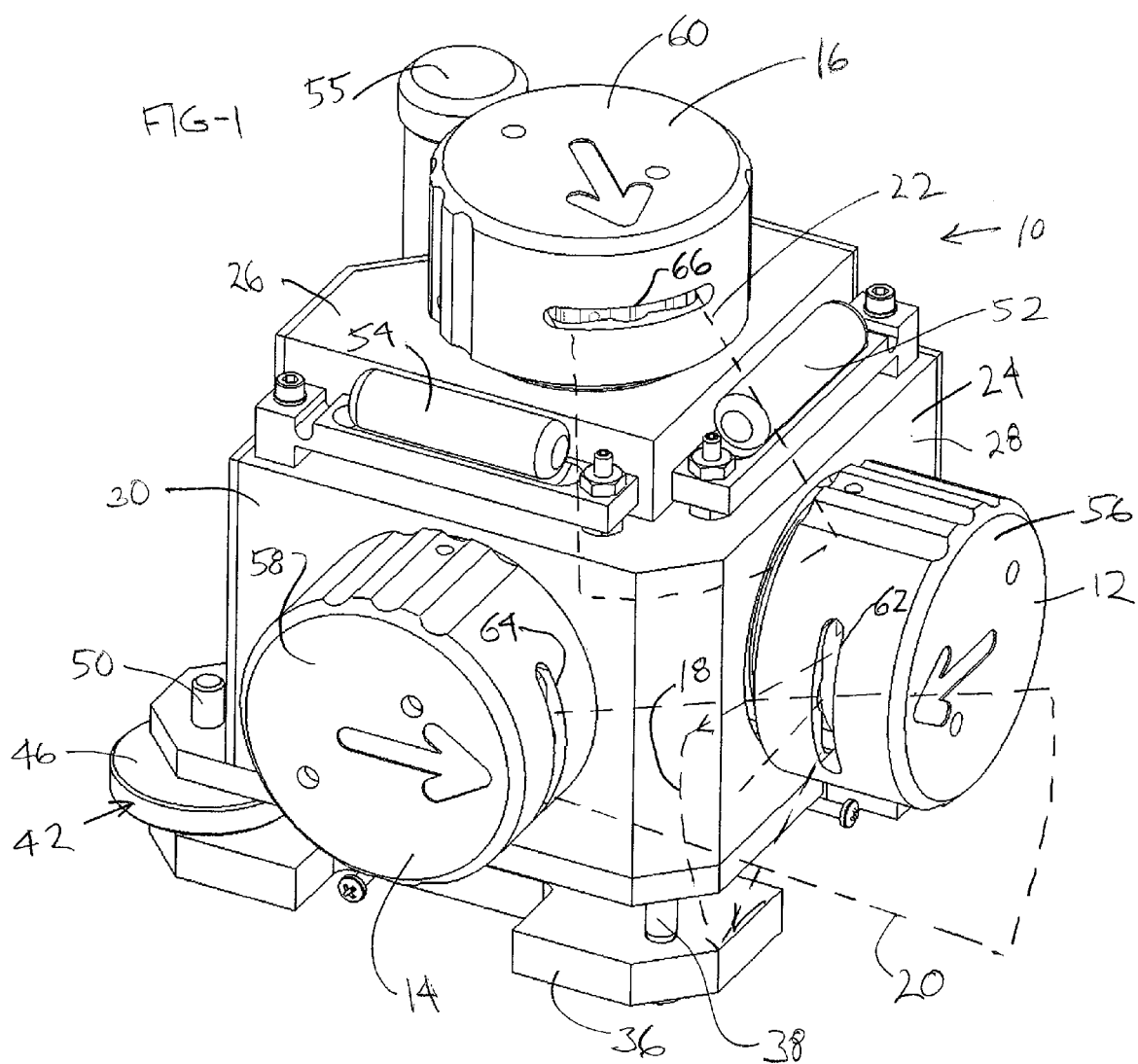
FIG. 1 is a perspective view of an embodiment of the reference beam generator.
Figure 2:
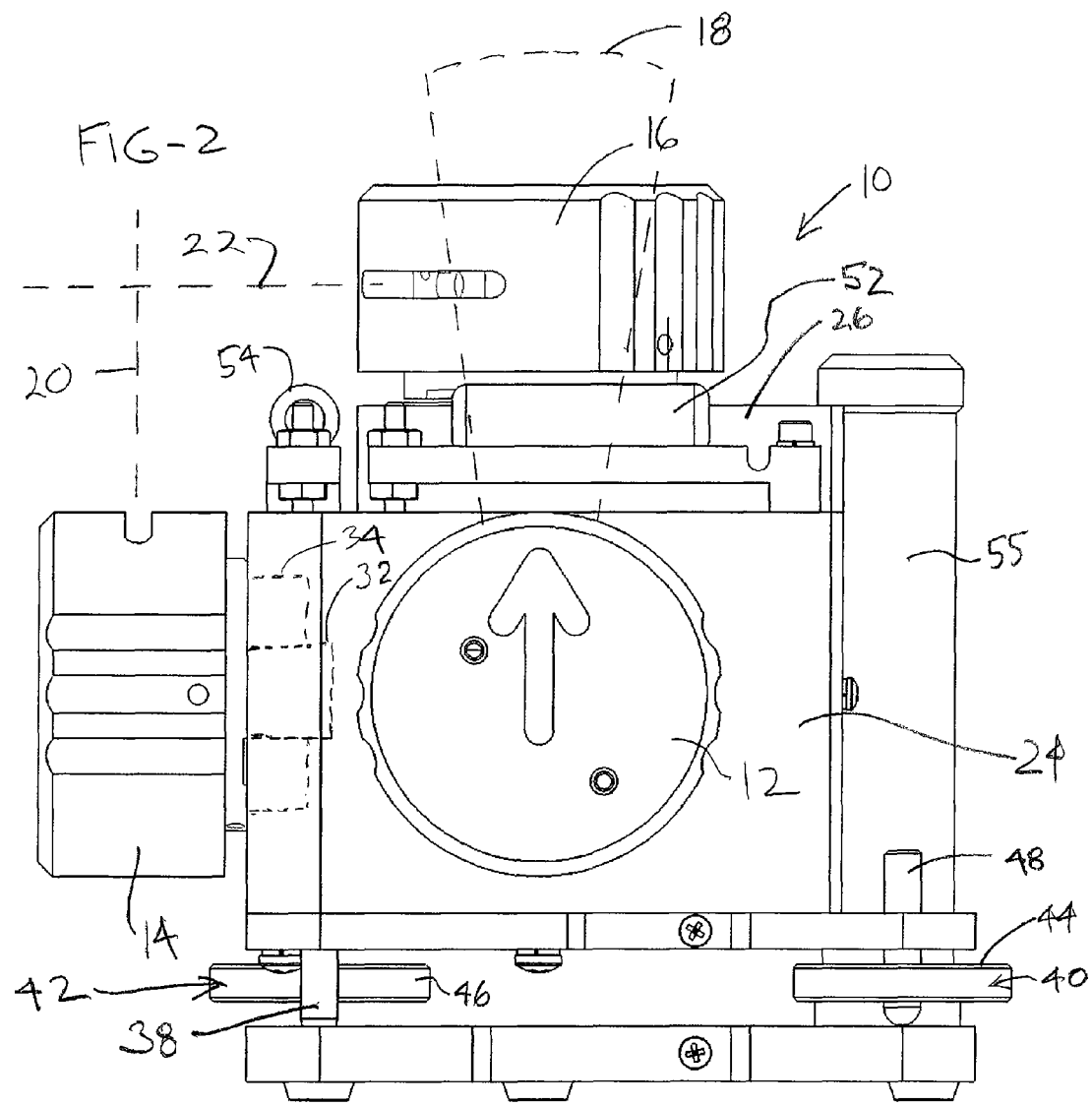
FIG. 2 is a side view of the reference beam generator, as seen looking left to right in FIG. 1.
Figure 3:
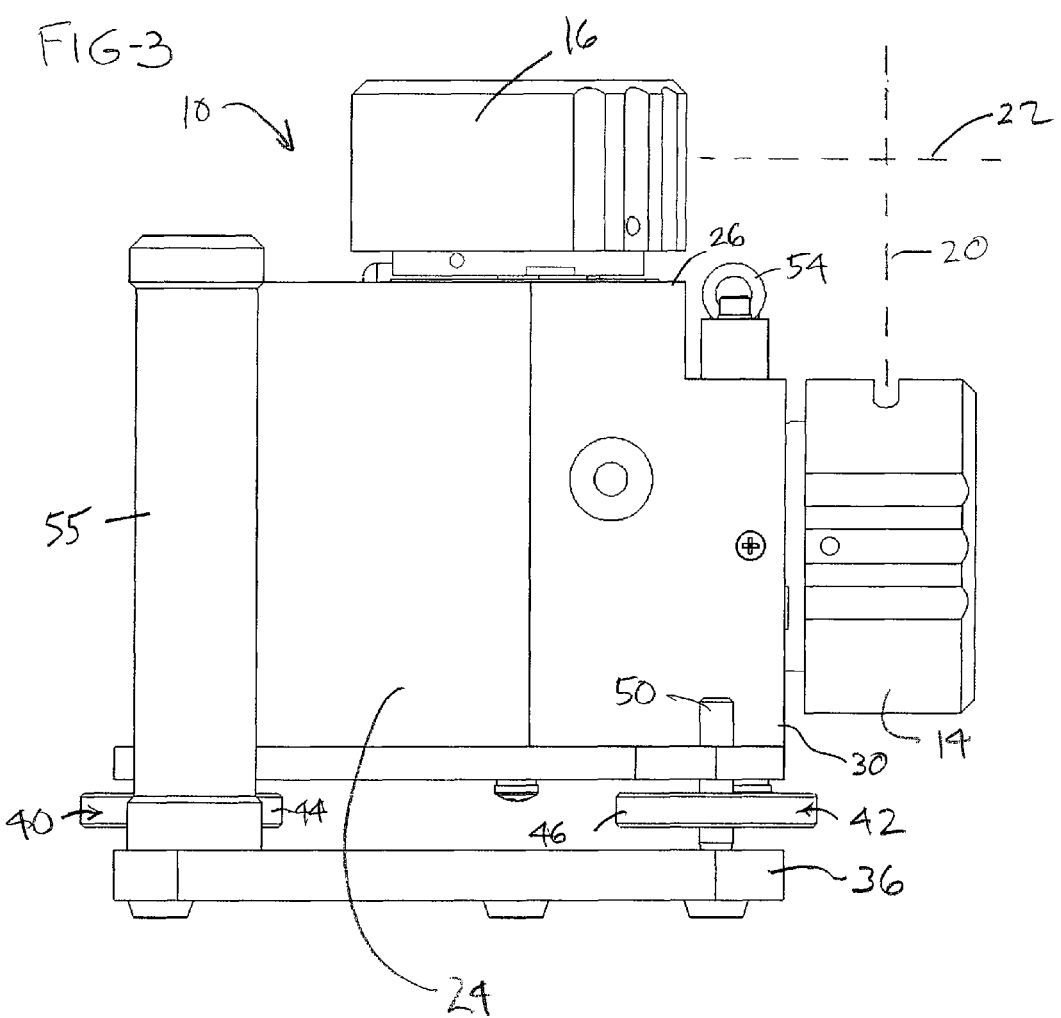
FIG. 3 is a side view of the reference beam generator, as seen looking right to left in FIG. 1.
Figure 4:
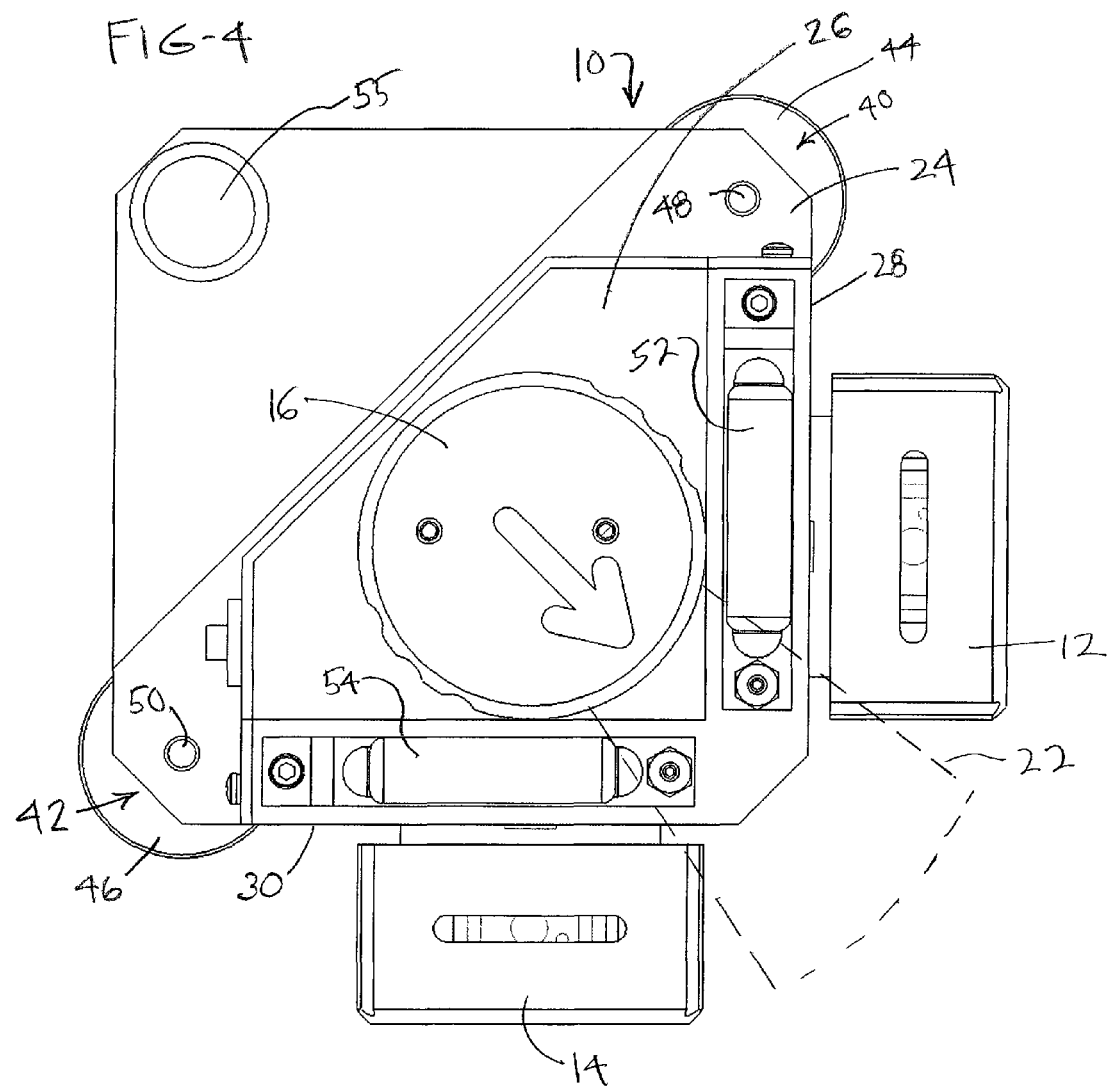
FIG. 4 is a top view of the reference beam generator.

Reference is made to FIGS. 1 through 4, which illustrate a reference beam generator 10 that includes first, second, and third projection turrets 12, 14, and 16, respectively. The first projection turret 12 projects a first fan beam of laser light 18, shown diagrammatically in dashed lines. The fan beam of laser light 18 is projected in a first plane, depicted in FIG. 1 as a vertical plane. The second projection turret 14 projects a second fan beam of laser light 20. The second fan beam of laser light 20 is projected in a second plane normal to said first plane. This is also shown as a vertical plane. Finally, the third projection turret 16 projects a third fan beam of laser light 22. The third fan beam of laser light 22 is projected in a third plane, shown as a horizontal plane that is normal to both the first plane and to the second plane in which the first fan beam 18 and the second fan beam 20 are positioned, respectively. The fan shaped beams 18, 20 and 22 are depicted, for purposes of illustration only, as short in length, thin, flat, and spreading in width. In fact, the thin, fan shaped beams produced by the reference beam generator extend many feet across a work site to provide reference lines and points at locations that are remote from the generator 10. Further the beams may spread by much greater angles; if desired; for example with fan beams may spread by angles substantially greater than 90°.

A turret support 24 supports the first, second, and third projection turrets 12, 14, and 16 such that each turret may be pivoted through a complete revolution about an axis that is normal to the plane in which it projects a fan beam of laser light. The turret support 24 includes an upper plate 26 and two side plates 28 and 30. Each of the turrets 12,14, and 16 includes a pivot arrangement for supporting the turret and permitting an operator to rotate the turret manually. For example, second turret 14 includes a shaft 32 engaged by bearing 34 secured in plate 30. Bearing 34 is selected to provide sufficient friction such that when the turret 14 is manually rotated into a desired position by an operator, the turret remains in that position until it is again rotated by the operator. If desired, an additional frictional element may be secured in the turret support 24 in contact with the shaft 32 to increase the frictional resistance to turning the turret 14. Although not illustrated in the drawings, the turrets 12 and 16 also have identical pivot arrangements providing their support, permitting the operator to rotate the turrets manually, and providing sufficient friction such that the turrets remain in position after they are manually rotated. The pivot arrangement provides for pivotal movement of each turret 12,14 and 16 about an axis that is substantially normal to the plane in which the fan beams of laser light 18, 20 and 22 are projected from the respective turrets. Other pivot arrangements may also be used in lieu of the shaft 32 and bearing 34.

When the reference beam generator is used, the turret support 24 is typically mounted on at tripod or other support structure. The tripod or other support structure is secured to a base plate 36. The upper portion of the turret support includes a support pin 38, and a pair of adjustment elements 40 and 42. The adjustment elements 40 and 42 include thumbwheels 44 and 46 which rotate threaded shafts, 48 and 50, respectively. Pin 38 permits the upper portion of the turret support 24 to tilt in two orthogonal directions as an operator rotates thumbwheels 40 and 42. To aid in the adjustment process, and to facilitate leveling the turret support 24, bubble vials 52 and 54 of conventional construction are mounted on the upper portion of the turret support 24. The fan beams can be projected very precisely in vertical and horizontal planes by this arrangement. A handle 55 is directly connected to plate 36 to allow the operator to adjust the generator 10 easily during the set up process.

Figure 5:
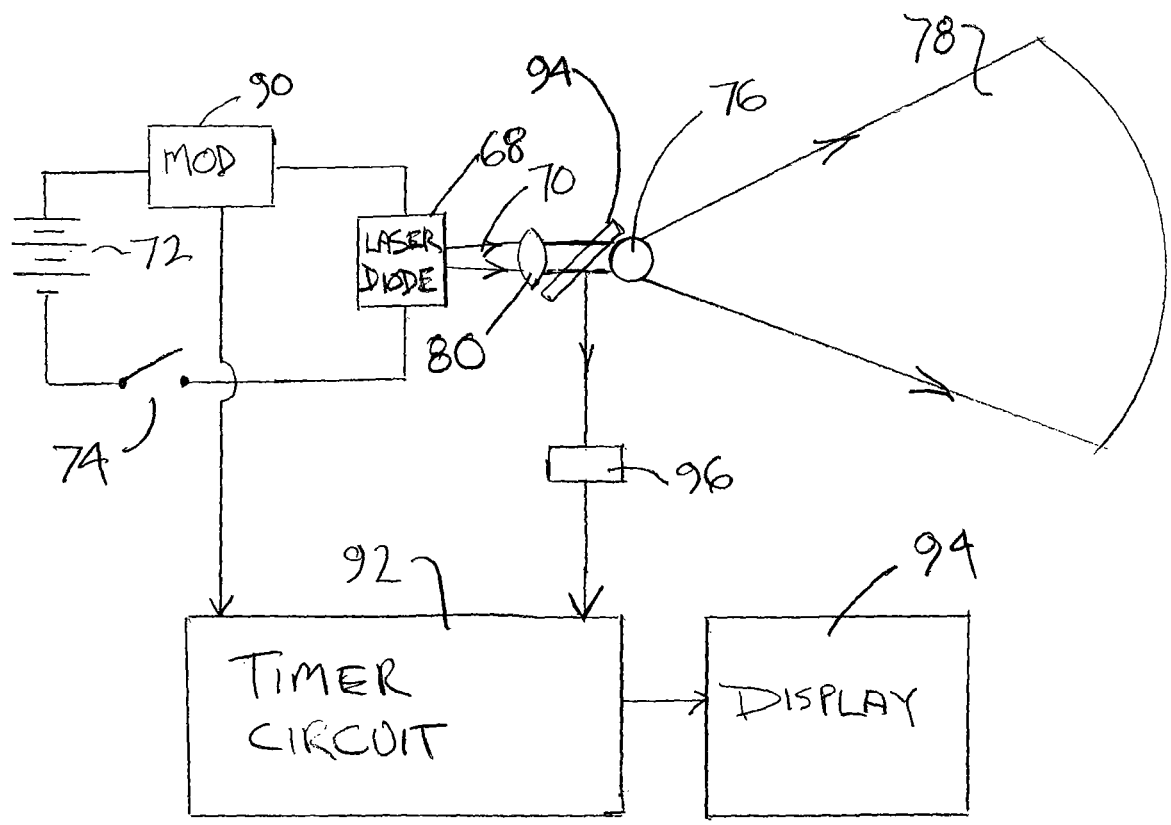
FIG. 5 is a schematic diagram illustrating the arrangement by which the generator may determine distance to a surface.

The projection turrets 12,14, and 16 include turret bodies 56, 58 and 60 which define slots 62, 64, and 66 from which the beams 18, 20, and 22 emerge, respectively. As depicted in FIG. 5, each turret body includes a laser source, such as laser diode 68 providing a beam of laser light 70, a power source, such as battery 72, for providing power to the laser diode 68 when switch 74 is actuated, and a lens, such as cylindrical lens 76 for redirecting the beam 70 into a fan shape indicated at 78. Also included in the beam path is a collimating lens 80 to collimate the laser light prior to spreading it into a fan configuration. The collimating lens 80 may be omitted if desired. Further a fan beam may also be created using a line-generating prism, or a diffractive optic.

Although a separate battery can be provided for each laser diode in each turret, if desired a single battery or other power source may be connected to the laser diodes in each turret through a sliding electrical contact arrangement or other arrangement. For such a central power supply, the power source is housed in the turret support 24 and each shaft 32 carries a pair of conductors that are contracted by sliding contacts or brushes which are connected to the power supply. Alternatively the conductors may be positioned on the turrets 12, 14 and 16. As yet a further alternative for providing power to the laser diodes in the turrets, a central battery may be provided in the turret support 24 with insulated leads running to each turret. Of course, with such an arrangement the rotation of each of the turrets is limited by the lengths of the leads.

The reference beam generator 10, shown in FIGS. 1 through 4, is manually adjusted. It will be appreciated, however, that various automatic features may be provided. For example, the projection turret support 24 may include a first pivot motor for rotating the first turret 12, a second pivot motor for rotating the second turret 14, and a third pivot motor for rotating the third turret 16. Each of the first, second and third pivot motors is preferably responsive to a motor control circuit. A remote control mechanism may allow an operator to control the rotation of each of the three turrets from a distance.

It will be appreciated that the reference beam generator produces reference lines that are projected onto surfaces. The reference lines are relatively bright. This is accomplished with low power laser diodes by limiting the length of the reference lines. If the fan beams 18, 20 and 22 are directed from the turrets through only a limited range, the power of the beam is more effectively used. For example, if the beam diverges at a 15 degree angle, the resulting line will be 24 times as bright as it would be if the beam were projected simultaneously through a full 360 degrees. Even a relatively wide 90 degree divergence produces a line that is 4 times as bright as would be the case if the beam were projected through a full 360 degrees. It may be desirable to add an even brighter reference circle in the center of the projected line. This is accomplished by directing a collimated beam of laser light to the cylinder lens 76 which is slightly larger than the cylinder lens. The cylinder lens 76 is supported in a manner such that most of the light beyond its periphery is unobstructed and passes around the cylinder lens 76 to form a spot in the center of a line of laser light projected from the turret. The light can pass around the cylinder lens 76 on only one side, or on both sides simultaneously.

Other variations in construction may be incorporated in the reference beam generator. For example, the first, second and third fan beams of laser light may each be produced using laser diodes of the type that produce green light, or red light. Further, different color fan beams may be produced from the various turrets.

If desired, the reference beam generator may be configured to measure and display the distances from the generator to surfaces on which the reference beams are projected. The generator may incorporate time-of-flight circuitry which measures the shortest time required for the beam to go from the generator to the surface, be reflected by the surface, and then return to the generator. As illustrated in FIG. 5, the generator may include a modulator 90 which very briefly disrupts power to the laser diode 68. A timer circuit 92 determines the time required for light returning from the surface to reach the generator, be reflected by mirror 94, and sensed by photodetector 96. The timer circuit 92 then outputs the measured distance to a display 94 for viewing by the operator.

Figure 6:
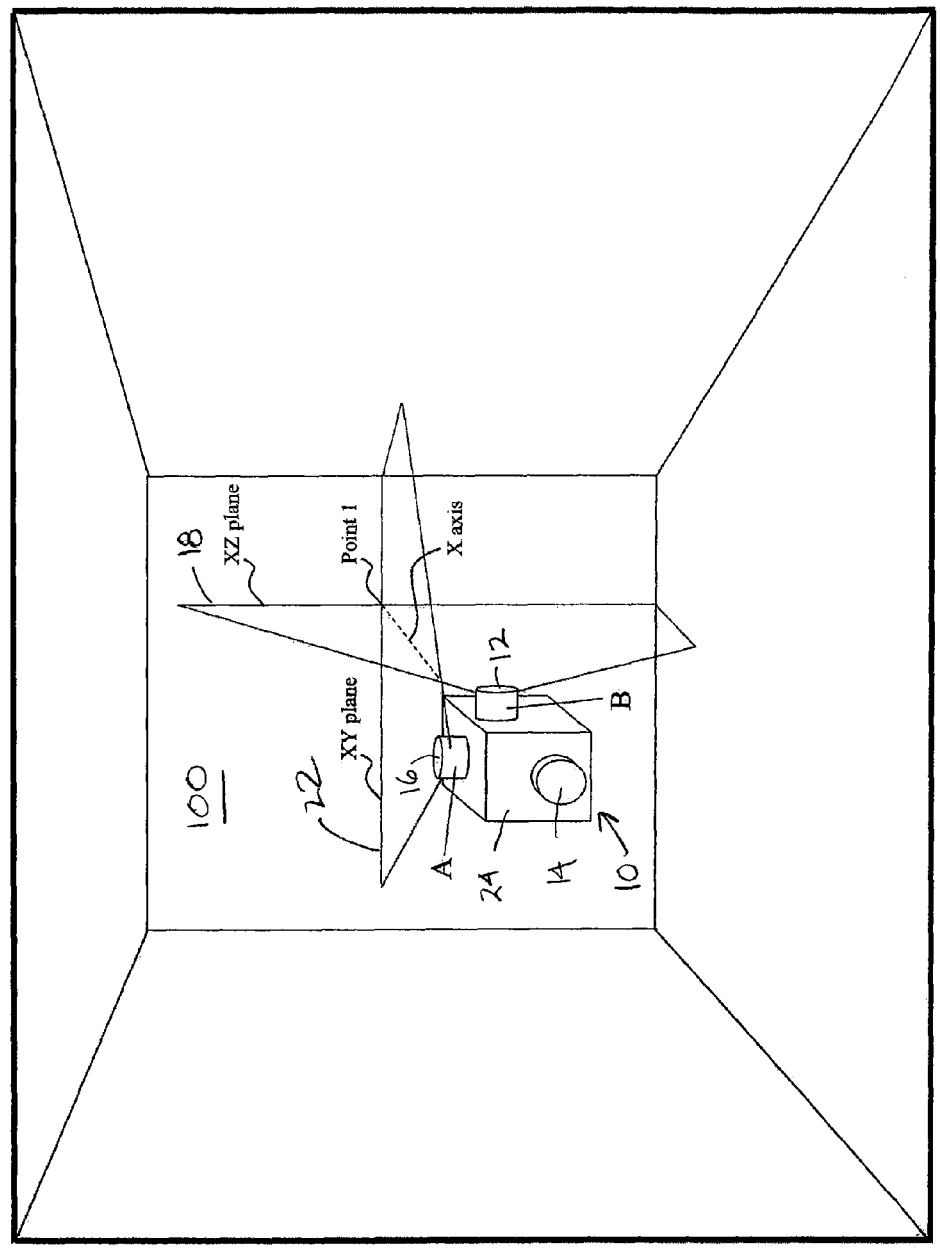
Figure 7:
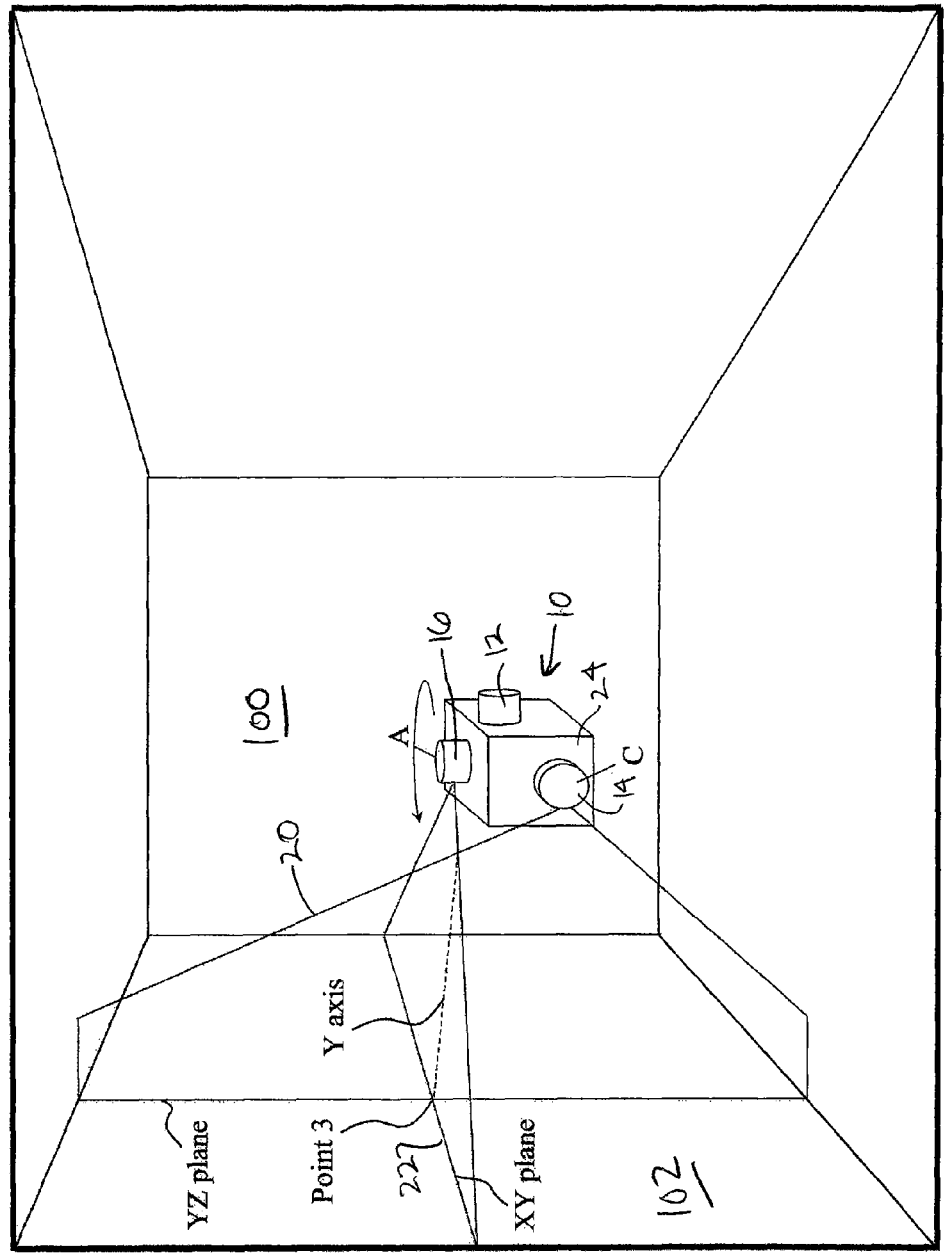
Figure 9:
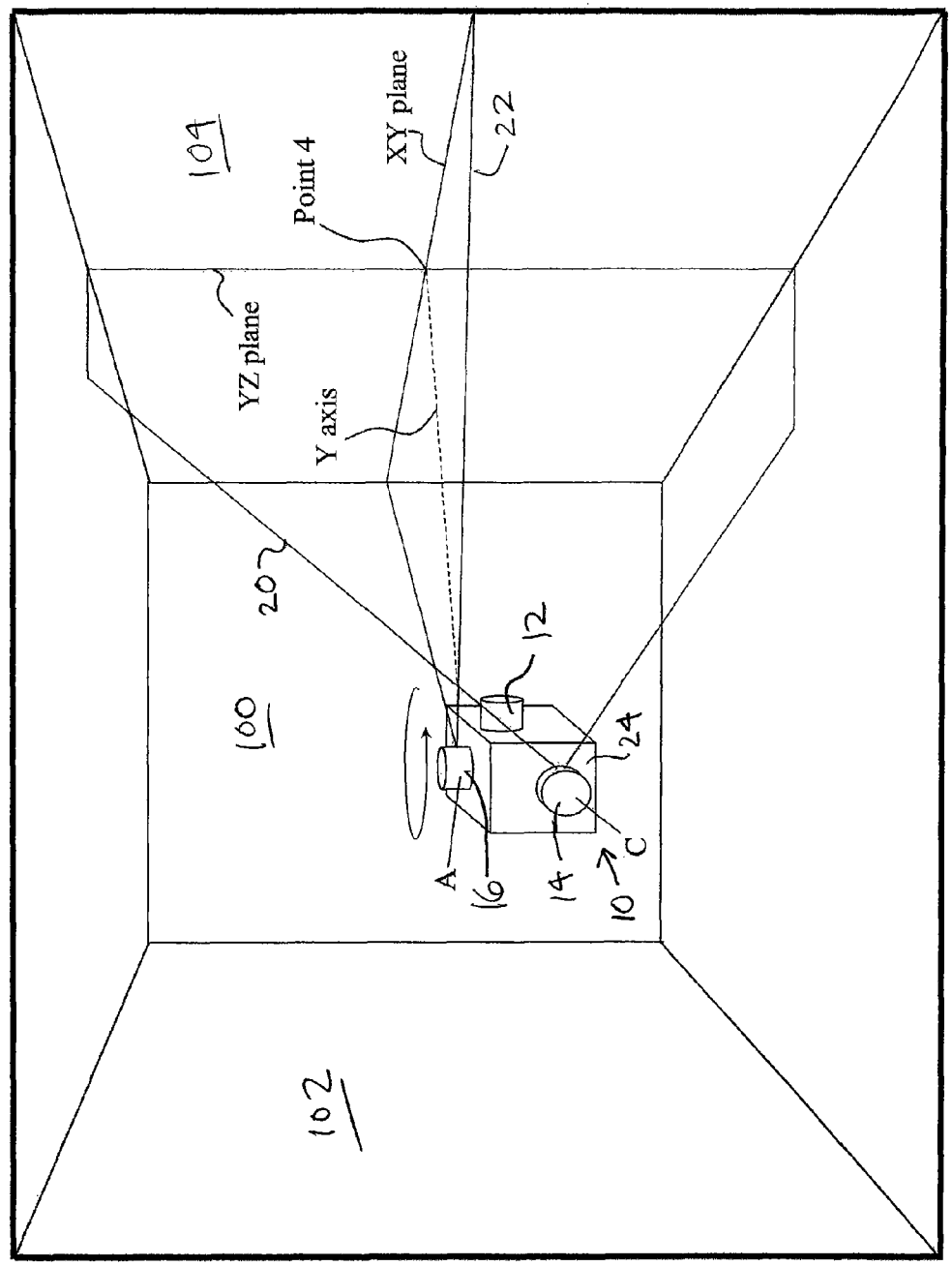
Figure 10:
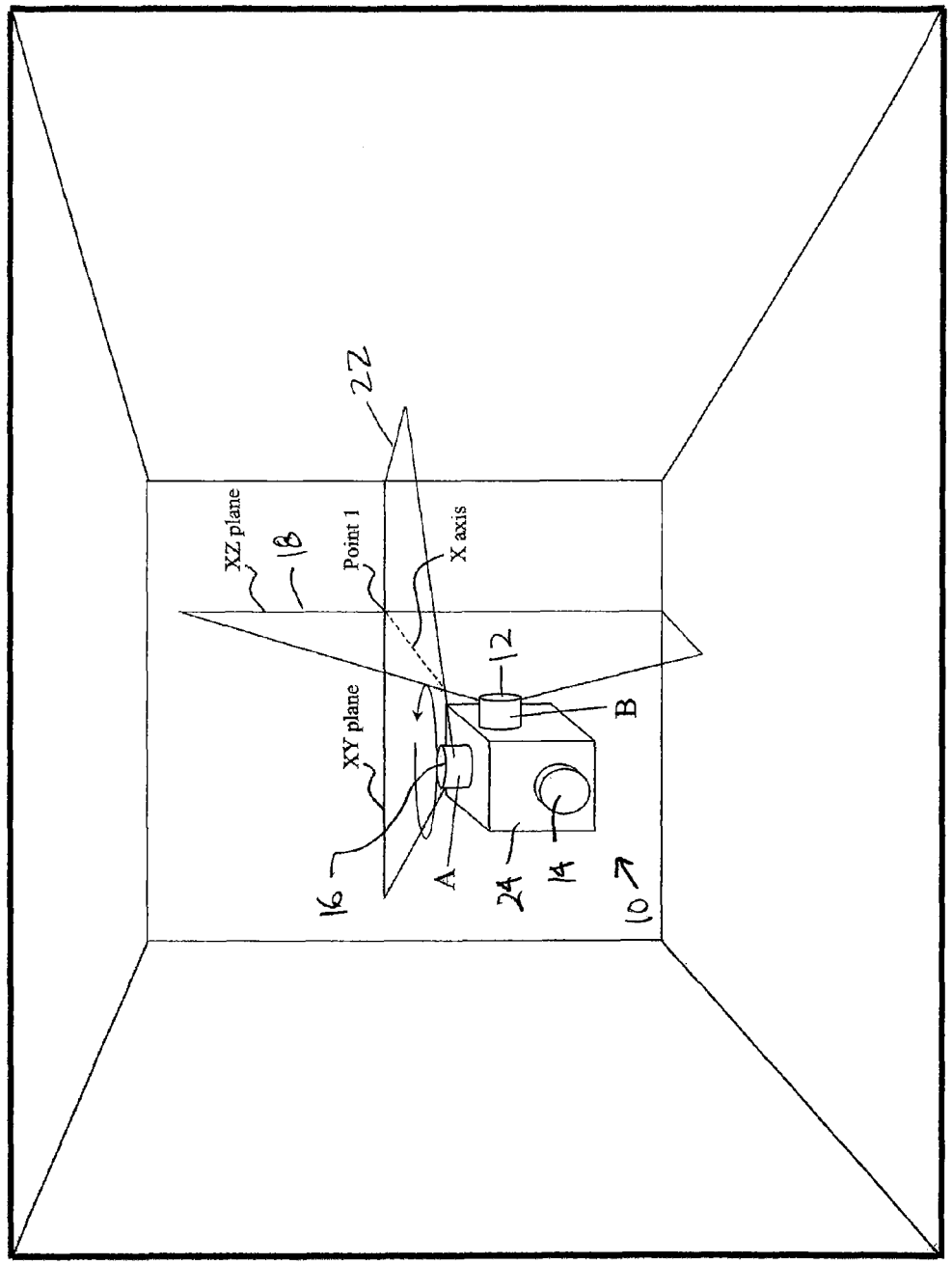
Figure 11:
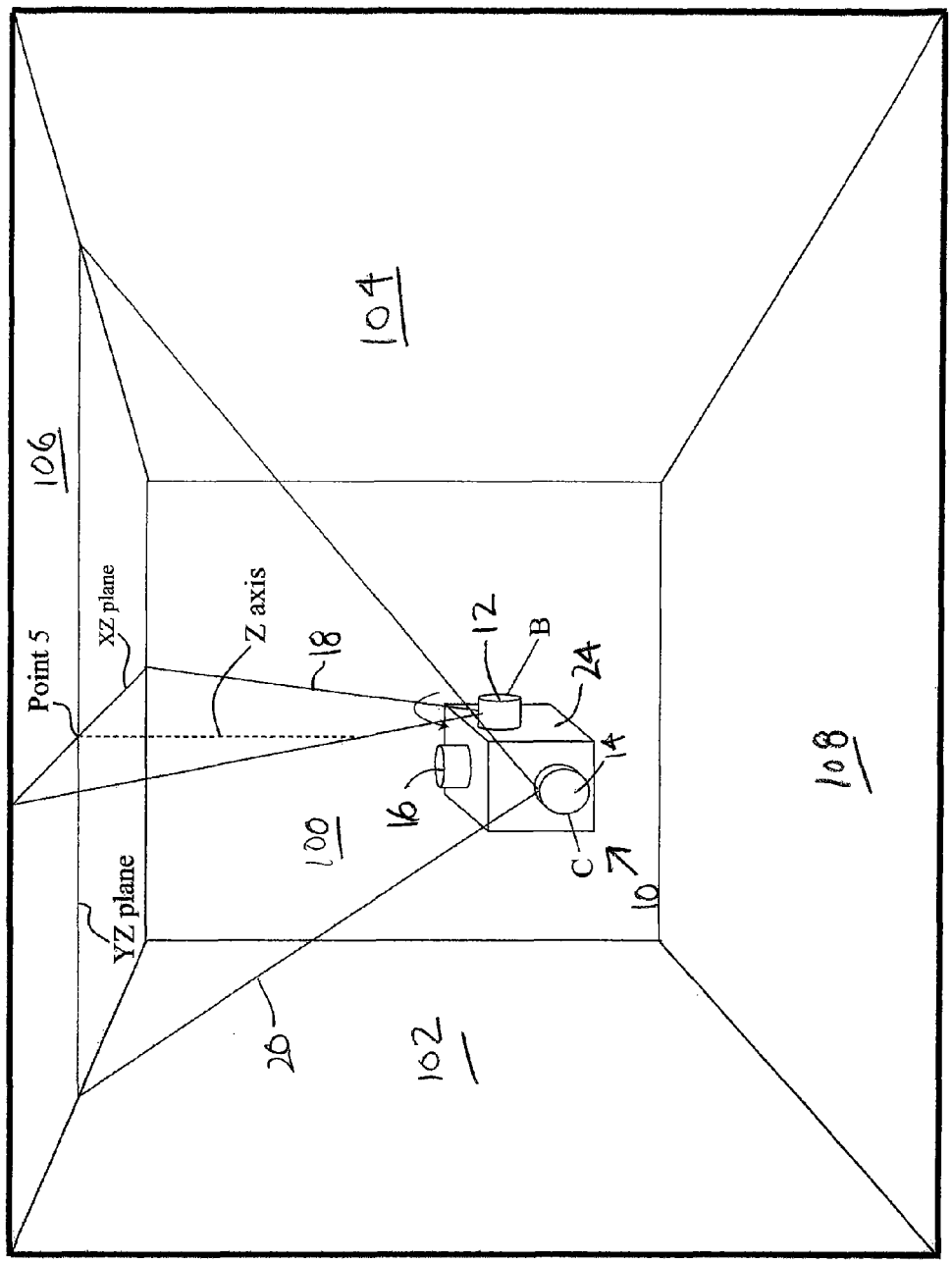
Figure 12:
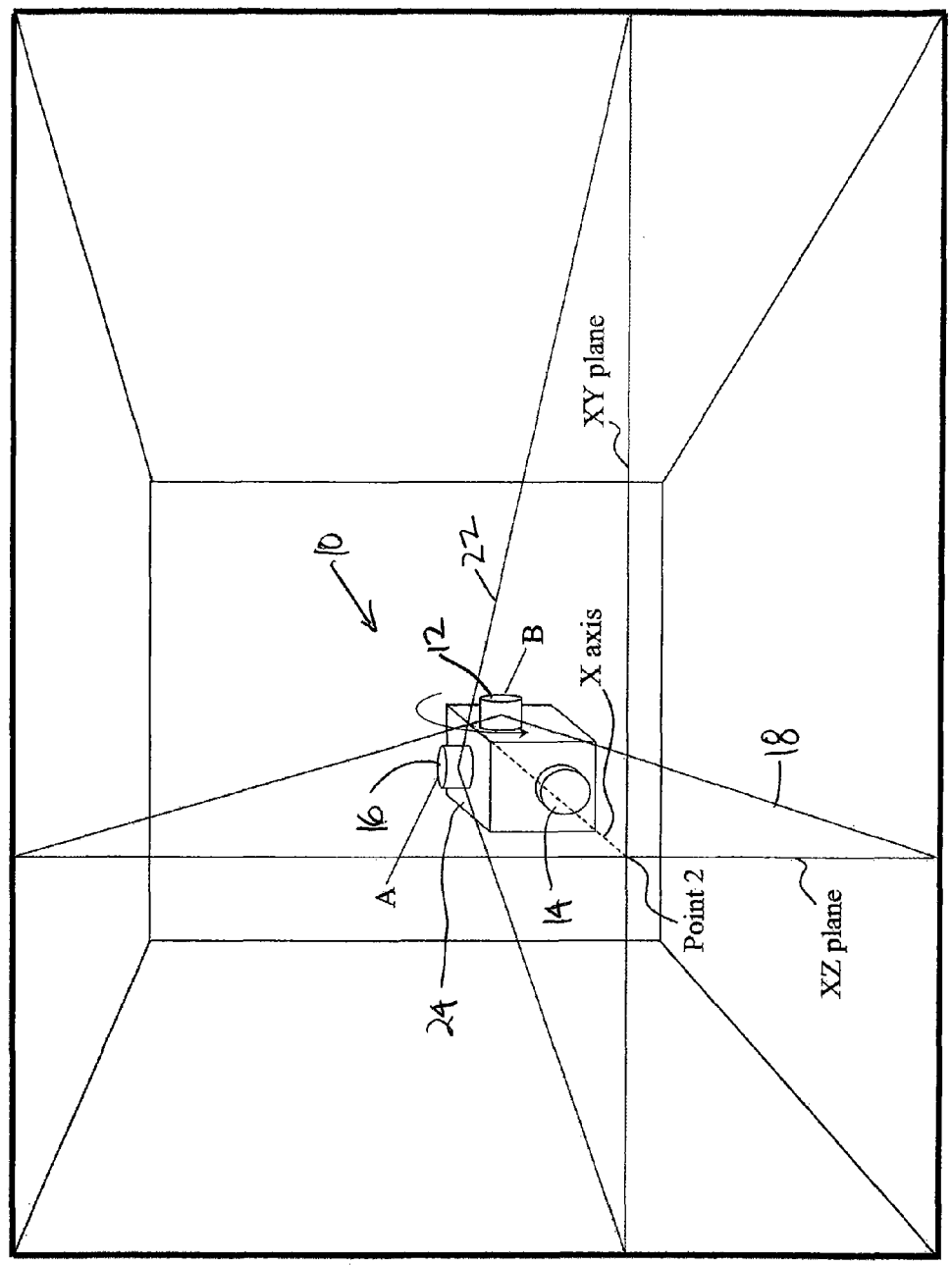
Figure 13:
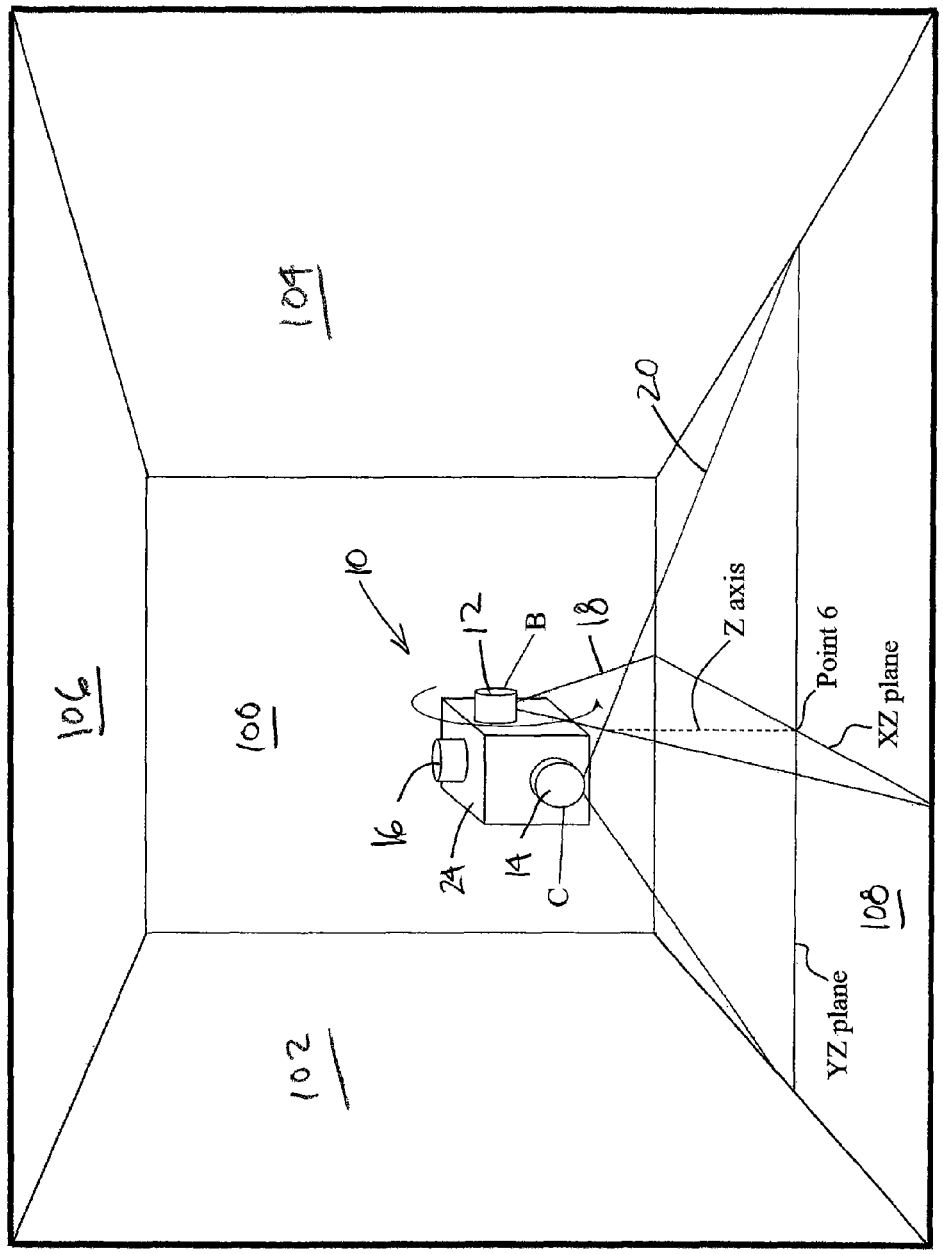
Figure 14:
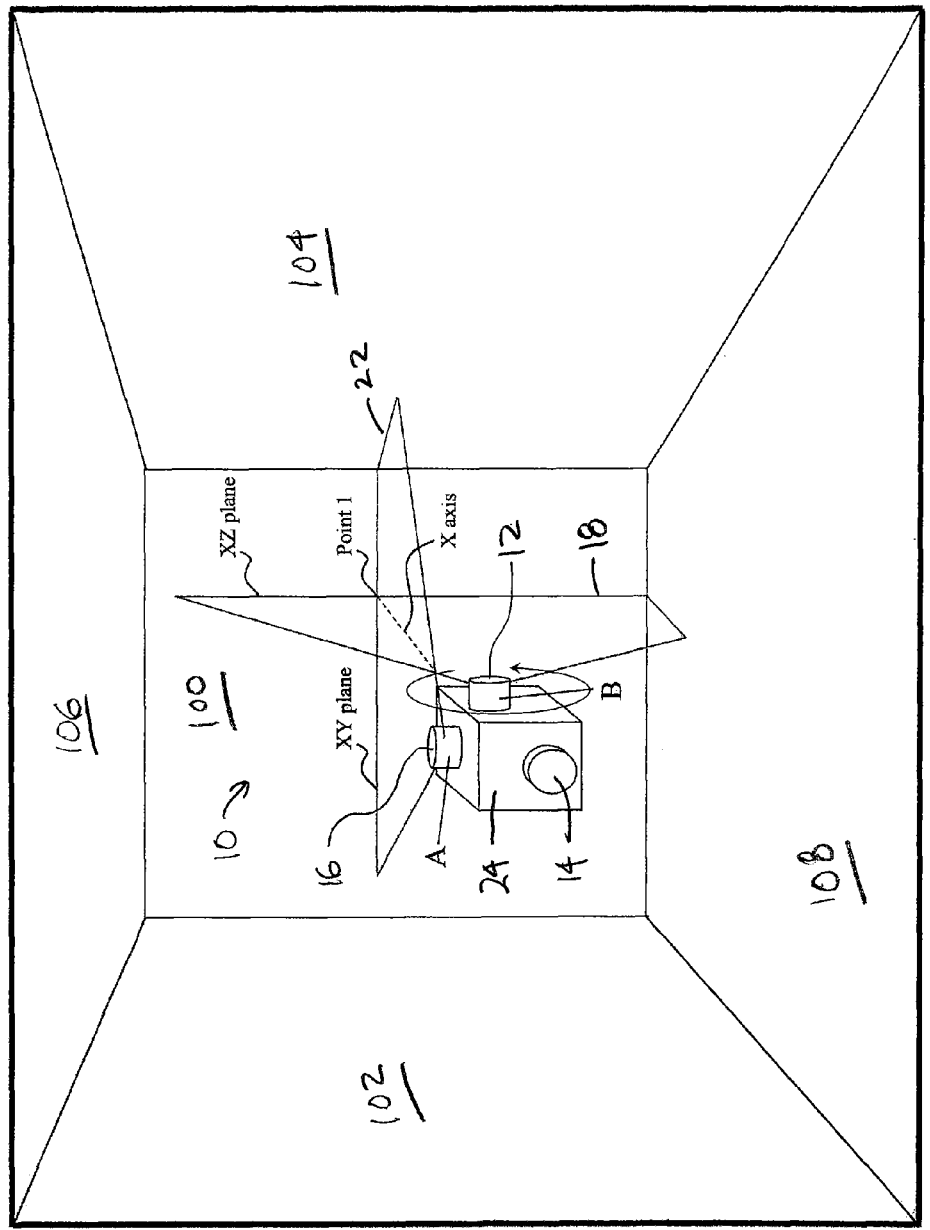
Figure 15:
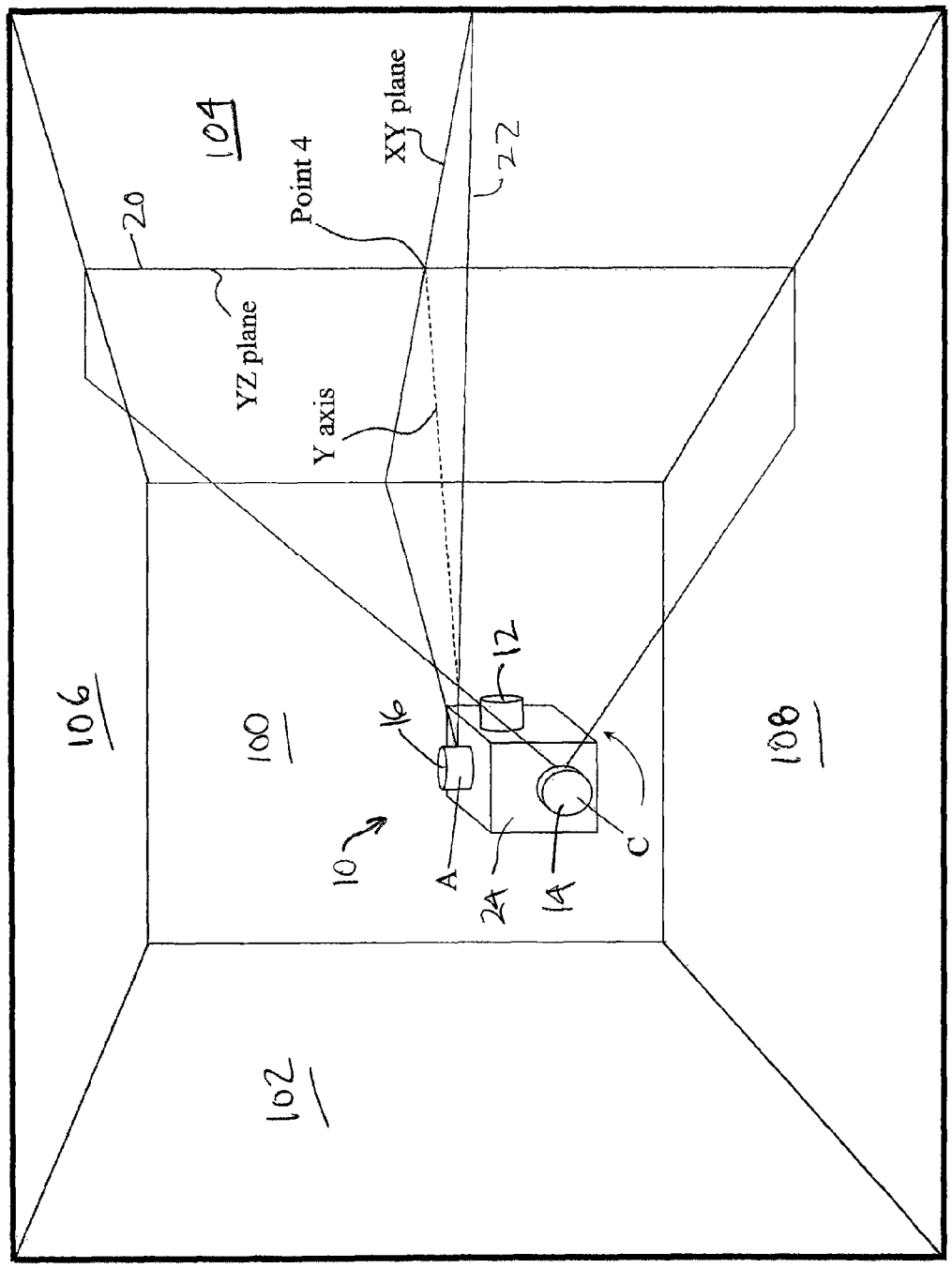
Figure 16:
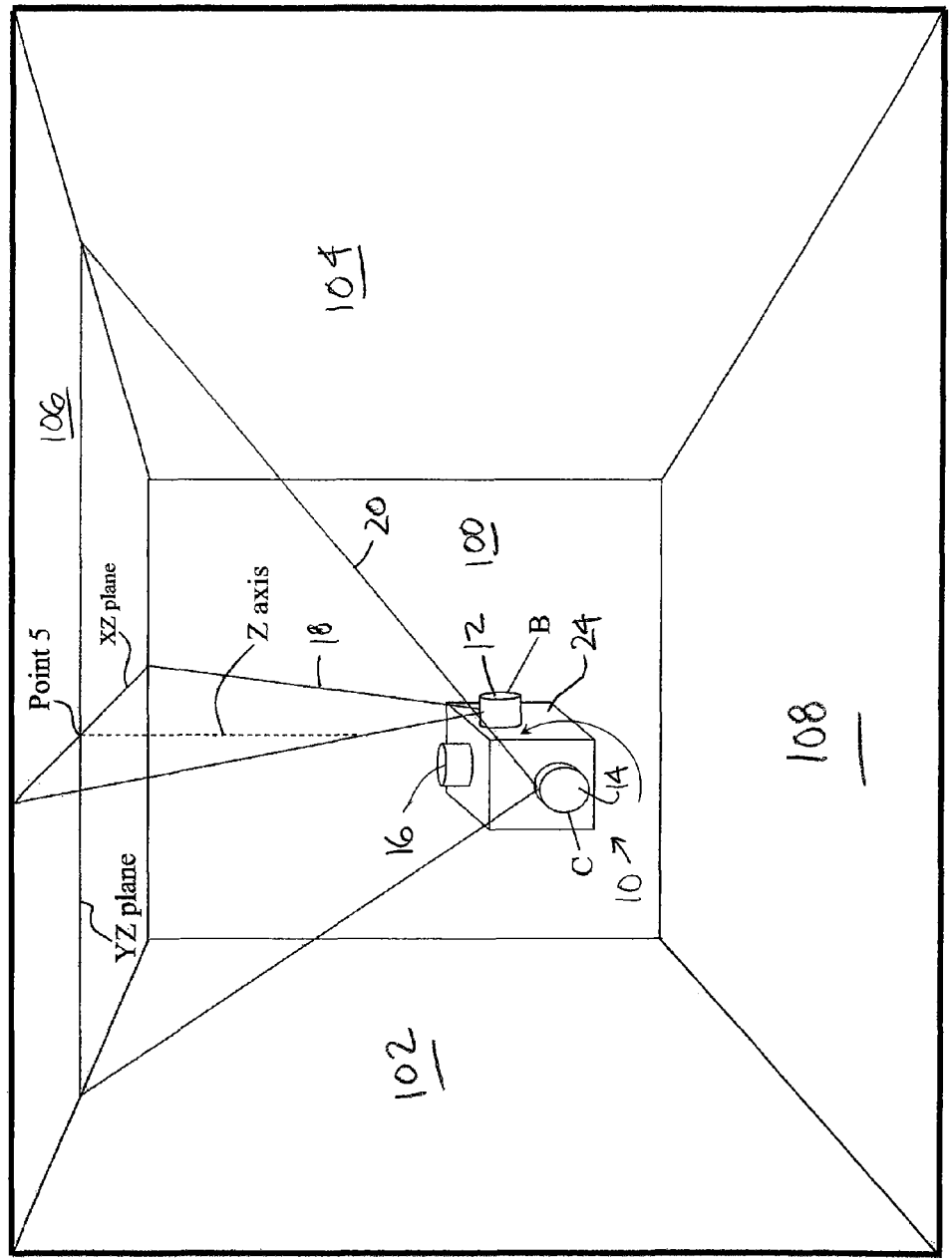
Figure 17:
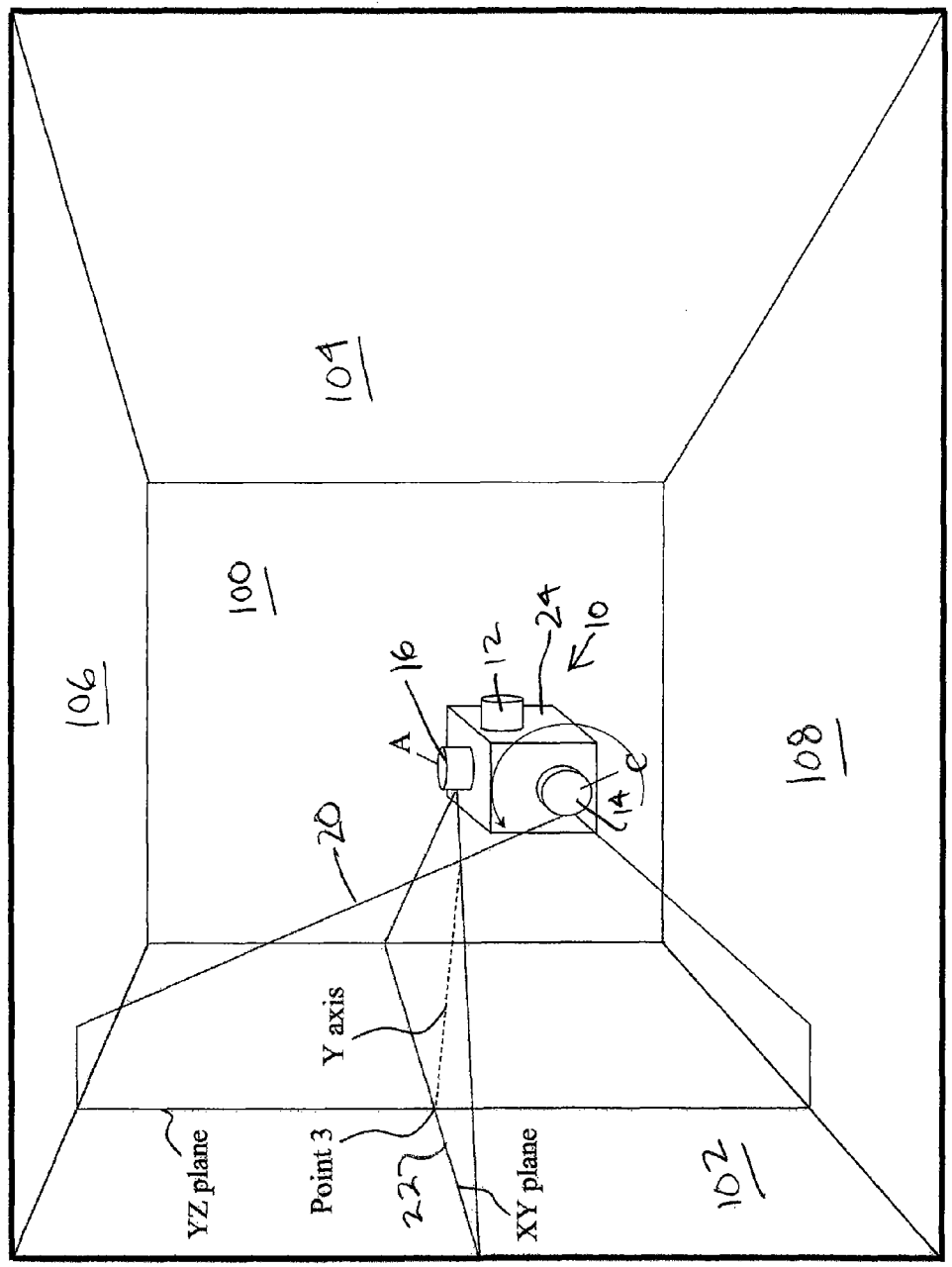
Figure 18:
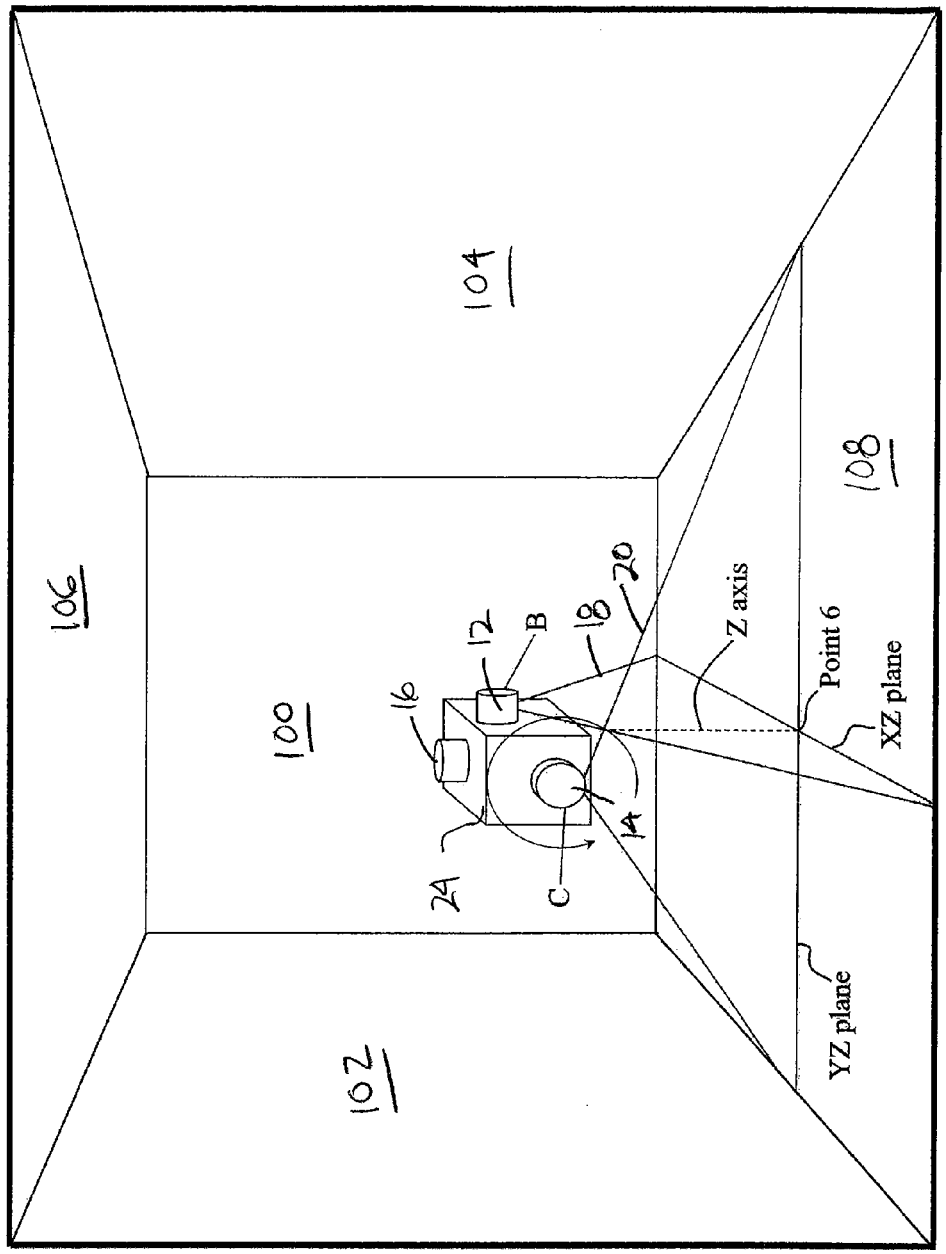
Figure 19:
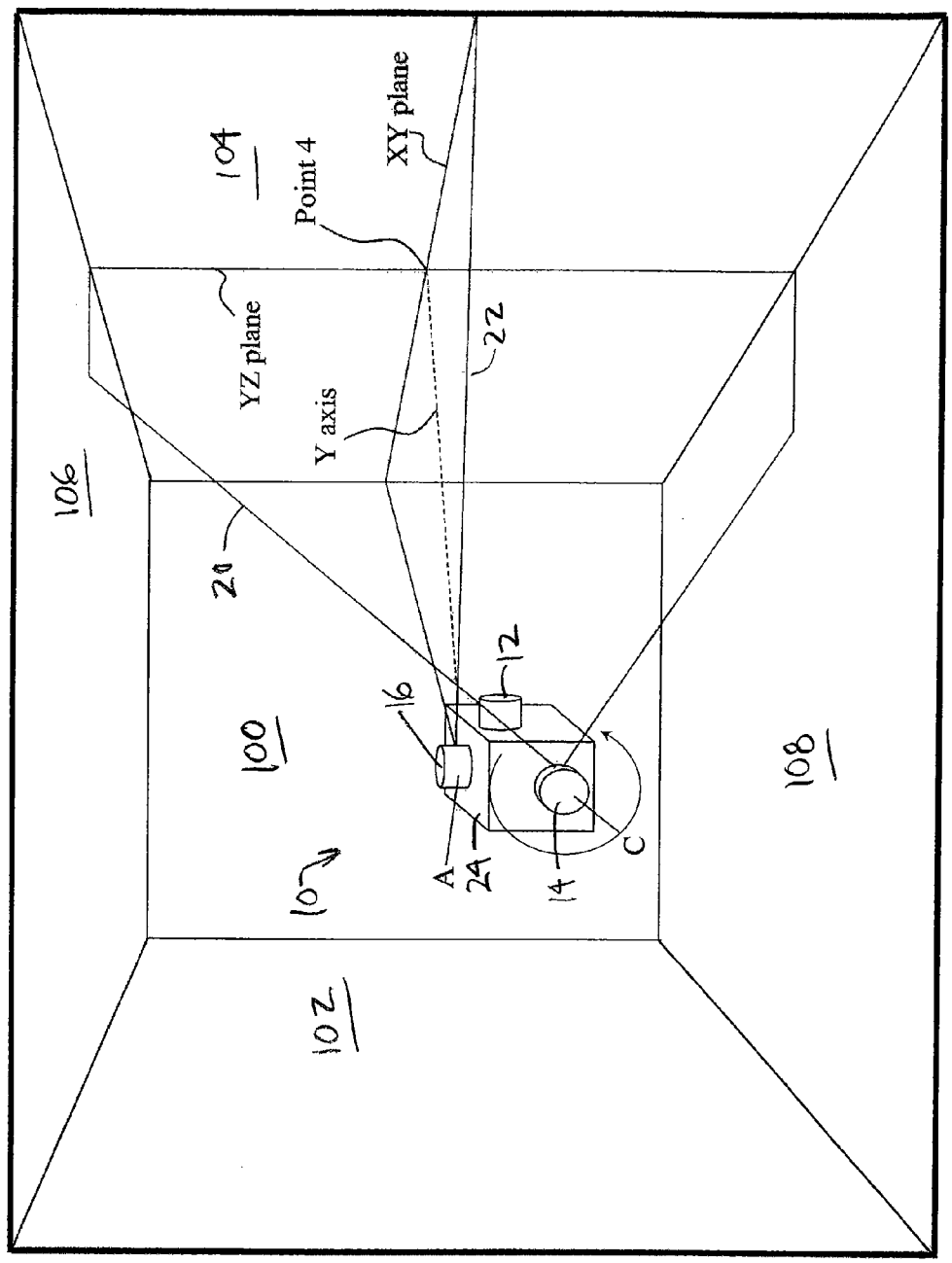

FIGS. 6 through 21 illustrate various ways in which the generator 10 can be used. Initially, the reference beam generator 10 must be oriented with respect to the multiple surfaces on which the beams are to be projected. For purposes of illustration, the drawings show a simplified generator 10 suspended in a diagrammatic representation of a room. As seen in FIG. 6, first and second fan beams of laser light 18 and 22 are projected on a first surface 100 such that a first reference point, "Point 1," is defined on the first surface at the intersection of the two beams 18 and 22. One of the two beams, illustrated as beam 22, is then rotated such that it strikes a second surface 102 adjacent to the first surface 100. Next, the third of the first, second, and third fan beams, illustrated as beam 20 in FIG. 7, is projected such that it strikes the second surface 102 and intersects the one of the first and second fan beams that strikes the second surface, defining a second reference point, "Point 3," on the second surface 102. This process is repeated in FIG. 8, projecting the beams onto the surface closest to the viewer, with beam 18 being switched back on, and beam 20 being switched off. "Point 2" is defined in this manner. This process is repeated in FIG. 9, defining "Point 4" on surface 104. The process is repeated again, returning the intersection of beams to "Point 1," as shown in FIG. 10.

Figure 20:
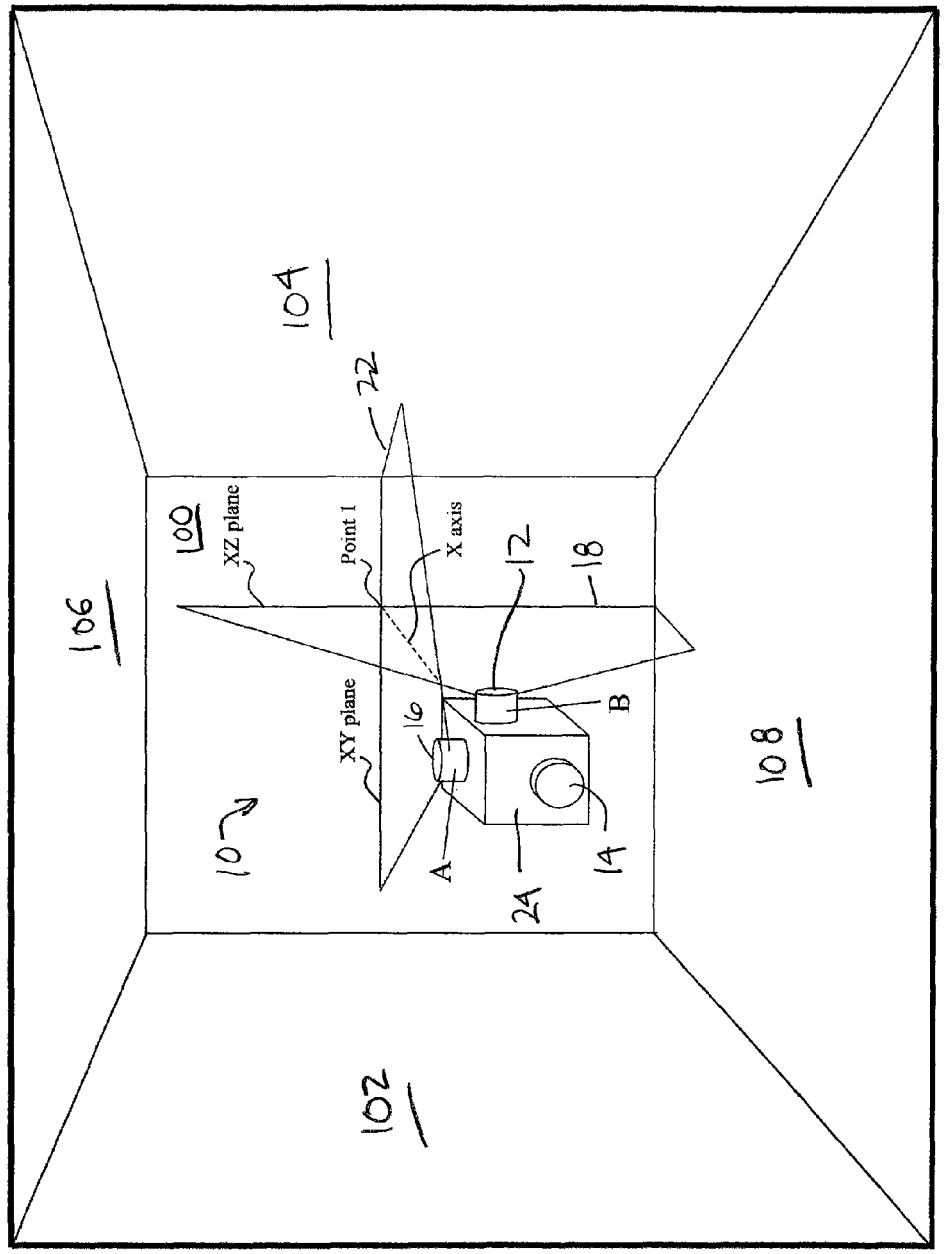
Figure 21:
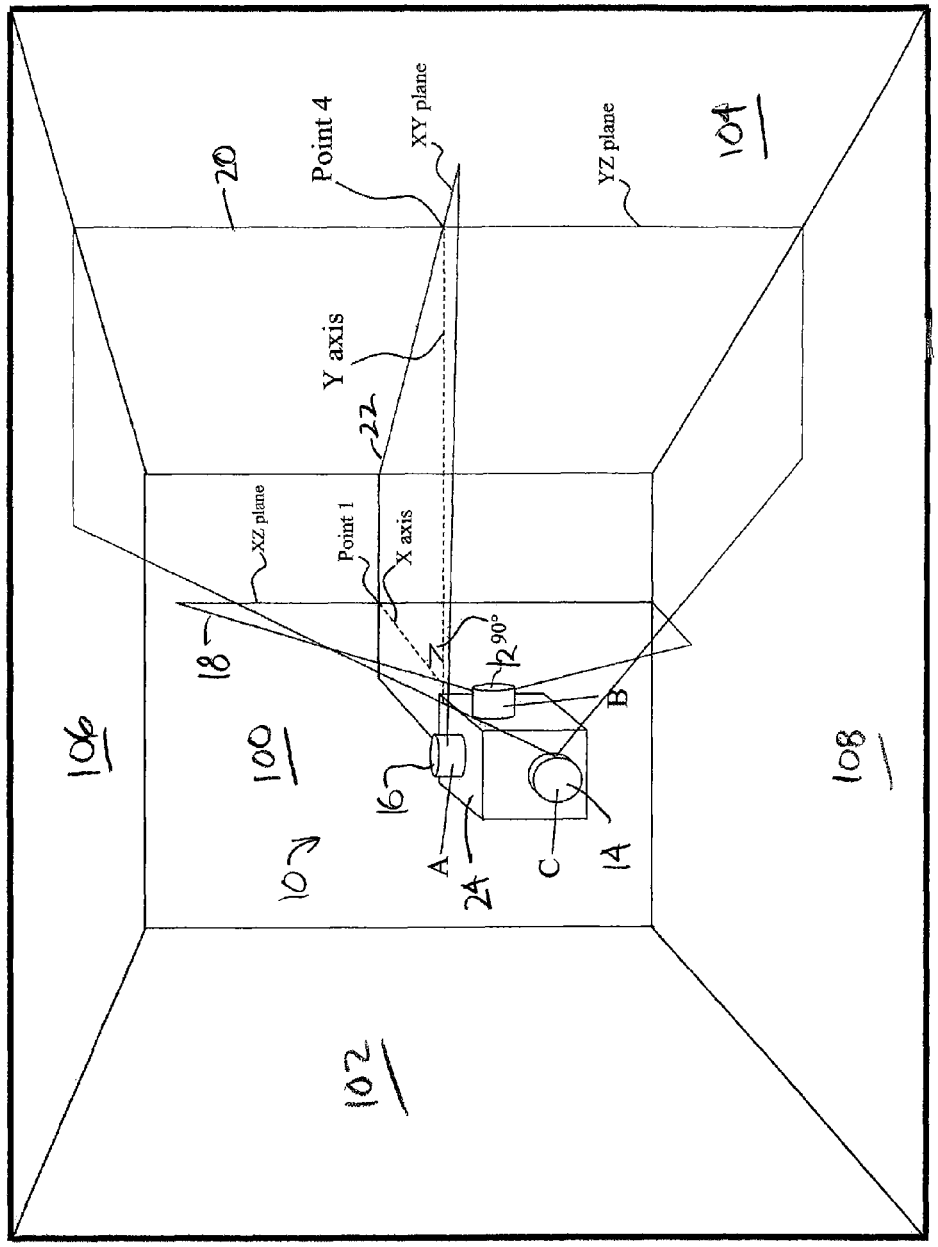

This process may be repeated, as shown in FIGS. 11 through 14, in which "Point 5" on surface 106, "Point 2" on the closest surface, "Point 6" on the surface 108, and "Point 1" on surface 100 are defined. This process may be repeated in FIGS. 15 through 19 in which "Point 4" on surface 104, "Point 5" on surface 106, "Point 3" on surface 102, and "Point 6" on surface 108 are defined the process is repeated again, returning the intersection of beams to "Point 4" on surface 104. FIGS. 20 and 21 depict the system transitioning from a two beam mode in which "Point 1" is defined on surface 100, to a three beam mode in which "Point 1" on surface 100 and "Point 4" on surface 104 are simultaneously defined.

Figure 8:
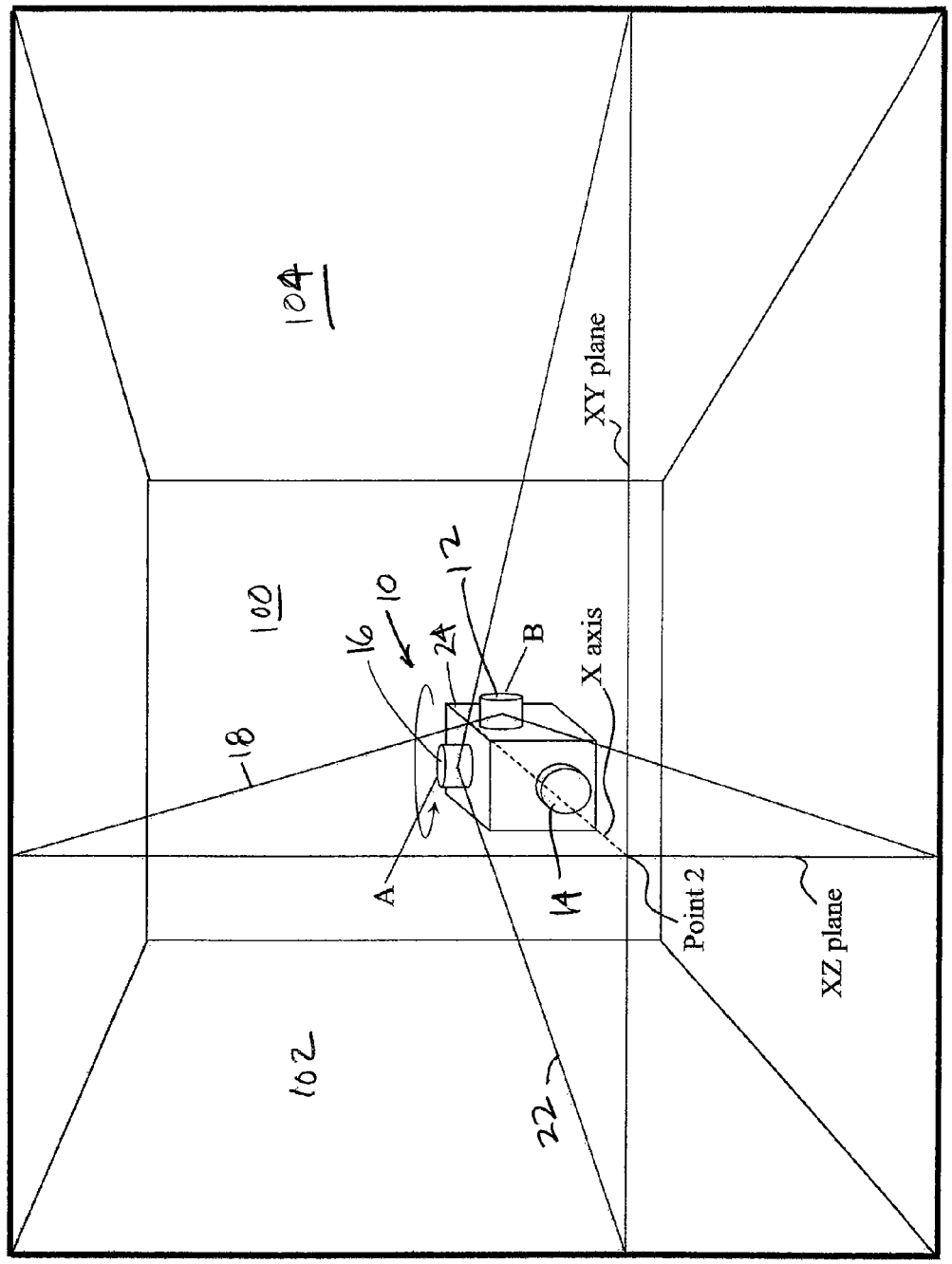

It will be appreciated that points from one surface may be transferred to corresponding points on opposed surfaces. For example, as shown in FIG. 6, the first and second fan beams of laser light may be projected on a first surface, for example 100, such that a first reference point, "Point 1," is defined at the intersection of the two beams 18 and 22. The first and second fan beams 18 and 22 may then both be rotated such that they both strike a second surface opposite the first surface, as shown in FIG. 8. The beams are then projected such that they strike the second surface and intersect thereon, thereby defining a second reference point, in this case "Point 2," on the second surface. The relative locations of Points 1 and 2 will depend on both the location of the generator 10 within the room and on its orientation.

It will be appreciated that although FIGS. 6-20 of the drawings illustrate the generator defining only one reference point and FIG. 21 of the drawings illustrates the generator defining only two reference points, by widening the fan beam three or more reference points may be defined by intersecting beams on the various surfaces. As shown in FIG. 22, the beams are sufficiently wide that turrets 12 and 14 can be turned up to create points 1, 4, and 5, or downward to create points 1, 4 and 6 in conjunction with fan beam 22 of turret 16. As shown in FIG. 22, points 1, 4 and 5 are defined by beams having a width of 90° or more. Even wider fan beams could be used to generate additional reference points on the various surfaces.

It will be appreciated that while laser diodes are preferred as the light sources for the reference beam generator, other laser beam sources may be used in certain applications. Additionally, a reference beam generator may be constructed which uses non-coherent light. Such a generator would have a much shorter operating range, however, as the reference beams would rapidly widen at a distance, and lessen the accuracy achievable.

Other aspects of the reference beam generator can be obtained from a study of the drawings, the disclosure, and the appended claims.

What is claimed is:

1. A reference beam generator, comprising:
   a first projection turret for projecting a first fan beam of laser light, said first fan beam of laser light being projected in a first plane;
   a second projection turret for projecting a second fan beam of laser light, said second fan beam of laser light being projected in a second plane normal to said first plane;
   a third projection turret for projecting a third fan beam of laser light, said third fan beam of laser light being projected in a third plane normal to both said first plane and to said second plane;
   a turret support, supporting said first, second, and third projection turrets such that each turret may be pivoted through a complete revolution about an axis that is normal to the plane in which it projects a fan beam of laser light; and
   a time of flight measurement arrangement for modulating at least one of the laser beams, detecting reflection of the modulated beam to the generator, and determining the distance from the generator of the surface from which the modulated beam was reflected.

2. The reference beam generator of claim 1 in which said turret support includes a first pivot arrangement for supporting said first turret, a second pivot arrangement for supporting said second turret, a third pivot arrangement for supporting said third turret, each of said first, second and third pivot arrangements permitting an operator to rotate the turret manually and providing sufficient friction that the turret remains in position after it is rotated.

3. The reference beam generator of claim 1 in which each of said first, second, and third projection turrets comprises:
   a laser diode providing a beam of laser light;
   a power source for providing power to said laser diode; and
   a lens for redirecting said beam into a fan shape.

4. The reference beam generator of claim 3 in which said power source in each of said turrets comprises a battery.

5. The reference beam generator of claim 3 in which each of said projection turrets further comprises a turret body housing said laser diode, said power source, and said lens, each of said projection turrets having a pivot arrangement connecting said turret body to said turret support, said pivot arrangement providing for pivotal movement of said turret about an axis substantially normal to the plane in which said fan beam of laser light is projected from said turret.

6. The reference beam generator of claim 3 in which said lens may comprise a collimating lens and a cylinder lens.

7. The reference beam generator of claim 1, further comprising bubble vials on said turret support to facilitate leveling said turret support, whereby said fan beams are projected in vertical or horizontal planes.

8. The reference beam generator of claim 1 in which said projection turret support includes a first pivot arrangement for supporting said first turret, said first pivot arrangement including a first pivot motor for rotating said first turret; a second pivot arrangement for supporting said second turret, said second pivot arrangement including a second pivot motor for rotating said second turret; a third pivot arrangement for supporting said third turret, said third pivot arrangement including a third pivot motor for rotating said third turret; each of said first, second and third pivot motors being responsive to a motor control circuit.

9. The reference beam generator of claim 1 in which each of said first, second, and third projection turrets comprises:
   a turret body;
   a laser diode and a cylinder lens in said turret body, said laser diode providing a beam of laser light, and said cylinder lens changing said beam into a fan shape; and
   a pivot arrangement connecting said turret body to said turret support.

10. The reference beam generator of claim 9 in which said laser diode is powered by a battery in said turret support.

11. The reference beam generator of claim 10 in which said battery is connected to said laser diode by means of sliding electrical contacts.

12. The reference beam generator of claim 9 in which each laser diode provides a beam of laser light of sufficient diameter such that a part of the beam passes around the cylinder lens, thereby producing a spot in the center of a line of laser light projected from the turret.

13. The reference beam generator of claim 1 in which said first, second and third fan beams of laser light are each green in color.

14. The reference beam generator of claim 1 in which first, second, and third projection turrets have laser diodes that can be individually switched on.

\* \* \* \* \*